(12) United States Patent
Takeuchi et al.

(10) Patent No.: US 6,720,109 B1
(45) Date of Patent: Apr. 13, 2004

(54) SECONDARY BATTERY AND MATERIAL THEREFOR

(75) Inventors: Masataka Takeuchi, Chiba (JP); Junko Mizuguchi, Chiba (JP)

(73) Assignee: Showa Denko K. K., Tokyo (JP)

( * ) Notice: Subject to any disclaimer, the term of this patent is extended or adjusted under 35 U.S.C. 154(b) by 61 days.

(21) Appl. No.: 09/684,633

(22) Filed: Oct. 10, 2000

Related U.S. Application Data
(60) Provisional application No. 60/162,898, filed on Nov. 1, 1999.

(30) Foreign Application Priority Data

Oct. 7, 1999 (JP) .......................................... 11-286364

(51) Int. Cl.$^7$ ............................................... H01M 4/60
(52) U.S. Cl. ...................................... 429/213; 429/304
(58) Field of Search ................................ 429/213, 304; 528/125; 525/474

(56) References Cited

U.S. PATENT DOCUMENTS

| | | |
|---|---|---|
| 4,768,130 A | 8/1988 | Bernard et al. |
| 4,804,594 A | 2/1989 | Jow et al. |
| 5,708,123 A | 1/1998 | Johannsen et al. |
| 5,741,611 A | 4/1998 | Fleischer et al. |

OTHER PUBLICATIONS

Wenle et al., "Conducting films of polyphenylquinoxaline", Polymer, vol. 35, No. 14, 2977, 1994. (No month available).*

Miras et al., Journal of Electroanalytical Chemistry, vol. 338, No. 1–2, pp. 279–297, 1992 (Abstract Only).*

Yamamoto et al., "Electrochemical Behaviour of Electrodes Modified with pi–Conjugated Polymers", Bulletin of the Chemical Society of Japan, 69, 3461–3468 (1996).*

Templier et al., "Electrochemcial effects of hydrofluoric acid on poyphenylquinoxaline (PPQ) polymer", Proceedigns Electrochemical Society, (USLI Sci. Tehno./1991), 712–719 1991. Abstract Only.*

Song et al, Properties of Polyphenylquinoxaline Acid Complex as an Electrode Material, Journal of Electrochemical Society, vol. 145, No. 4, Apr. 1998.

Petit et al, Electrochemical Properties of Polyphenylquinoxaline Films, Journal of the Electrochemical Society, vol. 145, No. 9, Sep. 1993.

Patent Abstracts of Japan, vol. 016, No. 008 (E–1152), Jan. 10, 1992.

* cited by examiner

*Primary Examiner*—Carol Chaney
(74) *Attorney, Agent, or Firm*—Sughrue Mion, PLLC

(57) ABSTRACT

The present invention provides a proton migration type secondary battery using as an electrode active material a polymer having a quinoxaline structure exhibiting a large proton insertion-release capacity, the secondary battery being excellent in its safety, reliability and rapid current properties, and having a long life and a high weight energy density (kWh/kg), compared with the conventional aqueous solution type double layer capacitor and a lead acid battery using sulfuric acid.

Also, the present invention provides a proton migration type secondary battery excellent in productivity and further in safety and reliability by using a solid electrolyte and/or a gel electrolyte obtained by curing a mixture of a polymerizable compound excellent in its polymerizability and a proton conductive electrolyte.

Further, the present inventors provide a proton migration type secondary battery having a further long life and excellent in reliability by adding a non-electrically conductive powder to the electrolyte.

1 Claim, 1 Drawing Sheet

Drawing
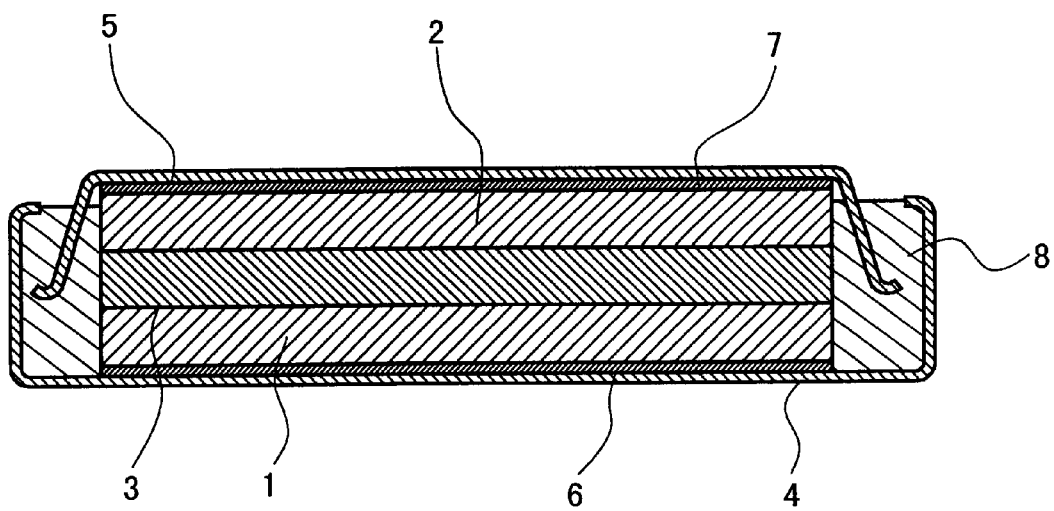

SECONDARY BATTERY AND MATERIAL THEREFOR

CROSS REFERENCE TO RELATED APPLICATION

This application is an application filed under 35 U.S.C. §111(a) claiming the benefit pursuant to 35 U.S.C. §119(e)(1) of the filing date of Provisional Application 60/162,898 filed Nov. 1, 1999 pursuant to 35 U.S.C. §111(b).

TECHNICAL FIELD TO WHICH THE INVENTION BELONGS

The present invention relates to a secondary battery using a positive electrode active material, a negative electrode active material each formed of a material capable of charge-discharge reaction by insertion-release of protons, and a proton conductive electrolyte, said secondary battery being excellent in safety and reliability, capable of taking out a large current, and excellent in cycle life. To be more specific, the present invention relates to a secondary battery characterized in that a specific polymer containing a quinoxaline structure is used in the positive electrode active material and/or a negative electrode active material.

BACKGROUND ART

Sale of new secondary batteries such as a nickel-hydride battery and a Li ion secondary battery, which have a high energy density and, thus, rapidly have come to be mounted to a small portable equipment, is rapidly increased in recent years. Particularly, use of a Li ion battery further promotes miniaturization in weight, size and thickness of the equipment and, thus, the Li ion battery now constitutes the main article of the secondary batteries. For example, vigorous researches are being conducted on a lithium ion battery comprising a positive electrode containing a metal oxide or a metal sulfide such as $LiCoO_2$, $LiNiO_2$, $LiMn_2O_4$ or $MoS_2$, a negative electrode containing lithium, a lithium alloy or a carbon material or an inorganic compound capable of absorbing-desorbing lithium ions, and an organic electrolyte. A lithium battery comprising a positive electrode containing $LiMn_2O_4$, $LiNiO_2$ is reported in "J. Electrochem. Soc., Vol. 138, No. 3, page 665, 1991".

There are many reports on the battery using a conducting polymer as an electrode active material. For example, a lithium secondary battery using polyanilines in the positive electrode has been put on the market by Bridgestone/Seiko Inc. as a coin type battery for use in a back-up battery, as reported in "27-th Battery Symposium, 3A05L and 3A06L, 1986". Also, it is proposed to use polyaniline, which is capable of oxidation-reduction by proton, as a positive electrode active material of a battery using an acidic aqueous solution (Bull. Chem. Soc. Jpn. 57, page 2254, 1984).

However, since a lithium-based battery uses lithium and/or a lithium compound that is active in water and air and, thus, is oxidized easily, problems such as safety and reliability in the cases of short-circuiting, high temperature, liquid leakage or unsealing are worried about. Therefore, counter measures for safety are taken by various methods such as an improvement of the separator, incorporation of a PTC element and sealing. Recently, various studies for using the polymer solid electrolyte exhibiting a lithium ion conductivity in place of an organic electrolyte solution are being made in an attempt to improve the safety and reliability. A battery of this type has now been partly put on the market. A battery using a solid electrolyte containing a polymer as a main component is more flexible than a battery using an inorganic material and, thus, produces a merit that the battery can be worked into various desired shapes. However, the battery studied up to now is defective in that the polymer solid electrolyte is low in its lithium ion conductivity, leading to the problem that the taken-up current is small.

The present inventors previously proposed in JP-A-10-289617 (The term "JP-A" as used herein means an "unexamined published Japanese patent application (Kokai)") a proton migration type secondary battery excellent in safety, reliability and current characteristics and having a long life and a large capacity in an attempt to improve the defects of the new type batteries such as the lithium ion batteries described above and, thus, to improve the safety, the rapid current characteristics and the like. Proposed as the electrode active materials of these batteries are polypyridine series and/or polypyrimidine series and/or sulfonic acid side chain series and/or hydroquinone series polymer and/or manganese oxide. Since the proton insertion-release can be performed easily in these materials, it was possible to obtain a secondary battery excellent in safety and its rapid current characteristics. However, since the capacity of the proton insertion-release is insufficient, the battery was markedly inferior to the conventional new type battery in the energy density of the battery.

In recent years, widely used in a memory back-up power source or the like is an electric double layer capacitor disposed of an ionic conductive solution (electrolyte solution) that is interposed between polarizable electrode materials consisting of a carbon material having a large specific surface area such as activated carbon and carbon black. For example, an electric double layer capacitor using an aqueous solution of sulfuric acid is proposed in "173rd Electrochemical Society Meeting, Atlanta, Ga., May 1988, No. 18". The electric double layer capacitor available on the market includes a capacitor using an organic electrolyte solution and a capacitor using an acidic aqueous solution such as sulfuric acid. The aqueous solution type is certainly low in its energy density. However, the electrolyte solution used in the capacitor of this type exhibits a high ionic conductivity and, thus, the capacitor can be charged and discharged at a high speed, leading to excellent rapid current characteristics.

It is reported in "J. Electrochem. Soc., Vol. 145, No. 4, page 1193, 1998" that polyphenyl quinoxaline exhibits an oxidation-reduction reaction within an acidic aqueous solution. However, this literature does not suggest the idea of utilizing the polyphenyl quinoxaline in a proton migration type battery. Of course, this literature does not suggest the idea of the present invention that polyphenyl quinoxaline is used in a negative electrode.

SUMMARY OF THE INVENTION

An object of the present invention is to provide a large capacity proton migration type secondary battery excellent in safety, reliability and rapid current characteristics, and having a long life. Another object of the present invention is to provide an electrode material and/or an electrolyte material that exhibits excellent characteristics when used in the secondary battery.

As a result of an extensive research conducted in view of the situation described above, the present inventors have found that a polymer containing a quinoxaline structure, which is used as an electrode active material, exhibits a large insertion/release capacity of protons, and that a proton migration type secondary battery using the particular polymer is excellent in safety, reliability and rapid current characteristics. It has also been found that the particular proton migration type secondary battery exhibits a long life and a high weight energy density (kWh/kg), compared with the conventional aqueous solution type double layer capacitor and the lead acid battery using sulfuric acid.

The present inventors have found that a proton migration type secondary battery excellent in productivity, safety, and reliability can be obtained by using such an electrolyte as a solid and/or gel electrolyte obtained by curing a mixture consisting of a polymerizable compound excellent in its polymerizing properties and an electrolyte exhibiting a proton conductivity.

The present inventors have also found that a proton migration type secondary battery having a further improved life and excellent in reliability can be obtained by adding a non-electrically conductive powder material to the electrolyte.

That is, the objects given above have been achieved in the present invention by developing a secondary battery given below:

1) A material comprising a polymer having a quinoxaline structure and being capable of charge-discharge reaction by insertion-release of protons.

2) The material comprising a polymer having a quinoxaline structure and being capable of charge-discharge reaction by insertion-release of protons as described in the above 1), wherein the polymer having a quinoxaline structure has a quinoxaline skelton as a repeating unit represented by the following formula (1):

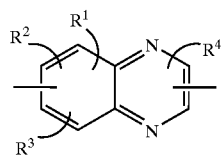

(1)

wherein each of $R^1$ to $R^4$ independently represents a hydrogen atom; a hydroxyl group; an alkyl group, which may have a hetero atom, having 1 to 20 carbon atoms; an alkenyl group, which may have a hetero atom, having 2 to 20 carbon atoms; an alkynyl group, which may have a hetero atom, having 2 to 20 carbon atoms; an aryl group that may have a substituent group; a hetero aryl group that may have a substituent group; a carboxyl group; or a carboxyalkyl group having 2 to 10 carbon atoms, which may be linear, branched or cyclic.

3) The material comprising a polymer having a quinoxaline structure and being capable of charge-discharge reaction by insertion-release of protons as described in the above 1), wherein the polymer having a quinoxaline structure has a quinoxaline skelton as a repeating unit represented by the following formula (2):

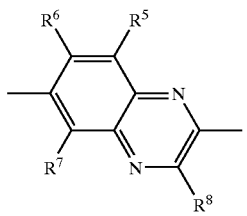

(2)

wherein each of $R^5$ to $R^8$ independently represents a hydrogen atom; a hydroxyl group; an alkyl group, which may have a hetero atom, having 1 to 20 carbon atoms; an alkenyl group, which may have a hetero atom, having 2 to 20 carbon atoms; an alkynyl group, which may have a hetero atom, having 2 to 20 carbon atoms; an aryl group that may have a substituent group; a hetero aryl group that may have a substituent group; a carboxyl group; or a carboxyalkyl group having 2 to 10 carbon atoms, which may be linear, branched or cyclic.

4) The material comprising a polymer having a quinoxaline structure and being capable of charge-discharge reaction by insertion-release of protons as described in the above 1), wherein the polymer having a quinoxaline structure has a quinoxaline skelton as a repeating unit represented by the following formula (3):

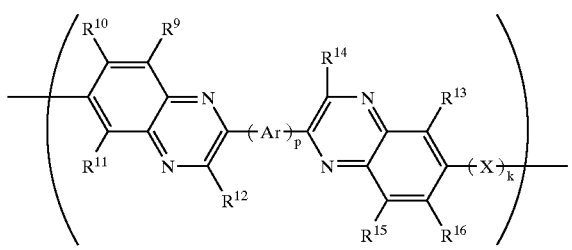

(3)

wherein each of $R^9$ to $R^{16}$ independently represents a hydrogen atom; a hydroxyl group; an alkyl group, which may have a hetero atom, having 1 to 20 carbon atoms; an alkenyl group, which may have a hetero atom, having 2 to 20 carbon atoms; an alkynyl group, which may have a hetero atom, having 2 to 20 carbon atoms; an aryl group that may have a substituent group; a hetero aryl group that may have a substituent group; a carboxyl group; or a carboxyalkyl group having 2 to 10 carbon atoms, which may be linear, branched or cyclic; Ar is a divalent aryl group that may have a substituent group or a divalent hetero aryl group that may have a substituent group; p is an integer of 1 to 5; X is a hetero atom, a divalent aryl group that may have a substituent group or a divalent hetero aryl group that may have a substituent group; and k is an integer of 0 to 5.

5) An electrode for a battery capable of charge-discharge reaction by insertion-release of protons, characterized by comprising the polymer recited in any one of items 1) to 4) and an electrically conductive carbon material.

6) The electrode for a battery according to item 5), wherein the electrically conductive carbon material is a fibrous carbon material.

7) A secondary battery, in which a positive electrode active material and/or a negative electrode active material is a material capable of charge-discharge reaction by insertion-release of protons, and an electrolyte exhibits a proton conductivity, characterized in that the material recited in any one of items 1) to 4) is used as the negative electrode active material.

8) The secondary battery according to item 7), wherein the electrolyte is a proton conductive solid and/or gel electrolyte.

9) The secondary battery according to item 8), wherein the solid and/or gel electrolyte is obtained by hardening a mixture consisting of a polymerizable compound having a double bond and a proton conductive substance.

10) The secondary battery according to any one of items 7) to 9), wherein powder of at least one kind of a non-electronically conductive material is contained in the electrolyte.

11) The secondary battery according to item 10), wherein the powder of at least one kind of the non-electrically conductive material consists of inorganic fine particles having a primary particle diameter of about 0.001 to about 10 μm.

BRIEF DESCRIPTION OF THE DRAWINGS

FIG. 1 is a cross sectional view schematically showing the construction of a coin type secondary battery as an example of a proton secondary battery of the present invention.

DETAILED DESCRIPTION OF THE INVENTION

The present invention will now be described in detail.

<Electrode Material>

In a polymer having a quinoxaline structure, which is used as a negative electrode material in the present invention, the quinoxaline structure is active under a relatively low potential (about 10 to 500 mV vs. NHE relative to the standard hydrogen electrode NHE) in respect of the electrochemical insertion and release of protons so as to exhibit a high charge-discharge capacity. It is considered reasonable to understand that the nitrogen atom of the quinoxaline structure exhibits a high affinity to protons, leading to the high charge-discharge capacity.

Among the polymers having a quinoxaline structure, it is preferable to use polyquinoxaline having as a repeating unit the structure represented by the following formula (1), formula (2) or formula (3) and/or derivatives thereof. The polymerization degree of these polymers falls within a range from 2 to 1,000,000, preferably from 10 to 100,000.

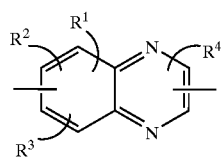

(1)

In formula (1), each of $R^1$ to $R^4$ independently represents a hydrogen atom; a hydroxyl group; an alkyl group, which may have a hetero atom, having 1 to 20 carbon atoms; an alkenyl group, which may have a hetero atom, having 2 to 20 carbon atoms; an alkynyl group, which may have a hetero atom, having 2 to 20 carbon atoms; an aryl group that may have a substituent group; a hetero aryl group that may have a substituent group; a carboxyl group; or a carboxyalkyl group having 2 to 10 carbon atoms, which may be linear, branched or cyclic.

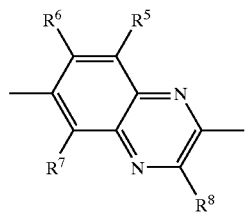

(2)

In formula (2), each of $R^5$ to $R^8$ independently represents a hydrogen atom; a hydroxyl group; an alkyl group, which may have a hetero atom, having 1 to 20 carbon atoms; an alkenyl group, which may have a hetero atom, having 2 to 20 carbon atoms; an alkynyl group, which may have a hetero atom, having 2 to 20 carbon atoms; an aryl group that may have a substituent group; a hetero aryl group that may have a substituent group; a carboxyl group; or a carboxyalkyl group having 2 to 10 carbon atoms, which may be linear, branched or cyclic.

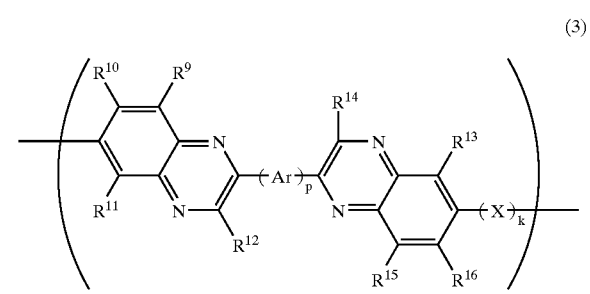

(3)

In formula (3), each of $R^9$ to $R^{16}$ independently represents a hydrogen atom; a hydroxyl group; an alkyl group, which may have a hetero atom, having 1 to 20 carbon atoms; an alkenyl group, which may have a hetero atom, having 2 to 20 carbon atoms; an alkynyl group, which may have a hetero atom, having 2 to 20 carbon atoms; an aryl group that may have a substituent group; a hetero aryl group that may have a substituent group; a carboxyl group; or a carboxyalkyl group having 2 to 10 carbon atoms, which may be linear, branched or cyclic; Ar is a divalent aryl group that may have a substituent group or a divalent hetero aryl group that may have a substituent group; p is an integer of 1 to 5; X is a hetero atom, a divalent aryl group that may have a substituent group or a divalent hetero aryl group that may have a substituent group; and k is an integer of 0 to 5.

The alkyl group included in the above formula (1), which may have a hetero atom, includes, for example, an alkyl group having an oxygen atom, a sulfur atom, a selenium atom, a silicon atom or a nitrogen atom substituted for the methylene group and an alkyl group having a halogen atom substituted for the hydrogen atom. Moreover, the alkenyl group, which may have a hetero atom, and the alkynyl group, which may have a hetero atom, are similar to the foregoing alkyl groups that may have a hetero atom. The aryl group, which may have a substituent group, represents an aryl group having an optional group selected from the substituent group consisting of a halogen atom, a cyano group, an alkyl group, an aryl group and an aryloxy group substituted therein. The hetero aryl group, which may have a substituent group, represents a heterocyclic group having an optional substituent group selected from a halogen atom, a cyano group, an alkyl group, an aryl group, and aryloxy group and also having 1 to 4 hetero atoms selected from an oxygen atom, a sulfur atom, a selenium atom, a silicon atom and a nitrogen atom.

Useful examples of $R^1$ to $R^4$ are a hydrogen atom; a hydroxyl group; a carboxyl group; and the following groups. The alkyl group, which may have a hetero atom, includes a methyl group, a trifluoromethyl group, an ethyl group, a methoxy group, and an ethoxy group. The alkenyl group, which may have a hetero atom, includes an ethenyl group, a 2-propenyl group, a 1,3-butadienyl group and a 4-methoxy-2-butenyl group. The alkynyl group, which may have a hetero atom, includes an ethenyl group and a 2-propnyl group. The aryl group, which may have a substituent group, includes a phenyl group, a thienyl group, a pyrrolyl group, a 4-methoxy-phenyl group, a 3-trifluoromethyl-phenyl group, a naphtyl group and a 3-methyl-thienyl group. Further, the carboxyalkyl group includes, for example, —CH$_2$COOH.

Concerning formula (2), useful examples of $R^5$ to $R^8$ are equal to those of $R^1$ to $R^4$.

Concerning formula (3), useful examples of $R^9$ to $R^{16}$ are equal to those of $R^1$ to $R^4$. Useful examples of Ar include, for example, a 1,4-phenylene group, a 1,3-phenylene group, a 4,4'-diphenylene group, a 3,3'-diphenylene group and a 4,4'-oxydiphenylene group. Useful examples of X include, for example, an oxygen atom, a sulfur atom, a selenium atom, a silicon atom, a $NR^{17}$ ($R^{17}$=H or a Cl to C10 alkyl group), a phenylene group, a 2,5-dimethoxy-phenylene group and a naphthylene group. It is desirable for p to be 1 or 2 and for k to be 0 or 1.

Examples of these compounds include, for example, polyquinoxaline (PQ) and its derivatives, polyphenyl quinoxaline (PPQ) and poly-2,2'-(p-diphenylene)-3,3'-diphenyl-6,6'-oxydiquinoxaline (POPQ) described in "J. Polymer Science: part. A-1, Vol. 5, page 1453, 1967". Among these compounds, polyquinoxaline, its derivatives and polyphenyl quinoxaline are preferable because a large amount of quinoxaline structures can be introduced into these compounds and the conjugated structure can be also easily expanded.

It is considered reasonable to understand that, in order to increase the proton insertion-release activity, it is necessary to expand the conjugated structure of the quinoxaline structure as much as possible. Also, since there is a possibility to use an acidic substance as an electrolyte and to use the electrolyte under high temperatures as described herein later, it is necessary to use a material excellent in acid resistance and heat resistance for forming the electrolyte.

The positive electrode material that is used in combination with the quinoxaline-based negative electrode material is not particularly limited in the present invention, as far as the material is stable within an acidic solution and exhibits an activity relative to the proton insertion-release reaction under a potential (about 600 to 2500 mV vs. NHE) higher than that of the quinoxaline-based negative electrode material.

Such materials include, for example, various carbon materials such as graphite and activated carbon, a conducting polymer, a metal oxide, a metal chalcogenide, and various organic metal complex compounds. Among these materials, a conducting polymer is preferable because the conducting polymer is flexible and, thus, can be formed easily into an electrode in the form of a thin film like the quinoxaline-based polymer used as a negative electrode material. The conducting polymer used as a positive electrode material includes nitrogen-containing conducting polymers such as polyaniline and its derivatives, polyindole and its derivatives, polypyrrole and its derivatives; sulfur-containing conducting polymers such as polythienylene and its derivatives, polyisothianaphthenylene and its derivatives; polyquinone and its derivatives; polyfurylene and its derivatives; polyselenophene and its derivatives; polyparaphenylene and its derivatives; polyallylene vinylene and its derivatives such as polyparaphenylene vinylene, polythienylene vinylene, polyfurylene vinylene, polynaphthenylene vinylene and the like.

Among these compounds, polyaniline and its derivatives, and polyindole and its derivatives are preferable because these compounds are excellent in their charge-discharge efficiency owing to the doping/undoping reaction of protons within an acidic solution.

In some cases, the activity for the proton insertion-release reaction can be increased by introducing a sulfonic acid group into the side chain of the conducting polymer. Such polymers include, for example, sulfonated polyaniline prepared by treating polyaniline within sulfuric acid, sulfonated thiophene and sulfonated polyisothianaphthene.

Also, polymers having a polyquinone structure such as polyquinone is preferable because the capacity of the proton insertion-release caused by the quinhydrone oxidation-reduction reaction is large.

The metal oxide and the metal chalcogenide are preferable as the electrode material in the present invention because these materials have a high bulk density and a high volume capacity density. These metal oxide and metal chalcogenide include, for example, manganese oxides, iron oxides, ruthenium oxides, titanium oxides, vanadium oxides and cobalt oxides.

<Electrolyte Material>

In general, an acidic solution is used in the present invention as a proton conductive electrolyte. The acidic solutions include, for example, an aqueous solution of sulfuric acid, an aqueous solution of polystyrene sulfonic acid, and an aqueous solution of perchloric acid. It is not preferable to use an aqueous solution of hydrochloric acid singly because the solution is highly volatile. Therefore, it is necessary to contrive the aqueous solution of hydrochloric acid to be compounded in combination with another material. The reliability and safety can be further improved in the present invention by using a proton conductive solid electrolyte. The materials used in the proton conductive solid electrolyte are not particularly limited, as far as these materials are not electronically conductive, and include, for example, proton conductive oxide solid materials such as alumina, silica, titania, magnesia and these complex oxides with other metals, and proton conductive polymers such as Nafion (trade name: Nafion™; manufactured by Du Pont Inc.), sulfonated imides and polystyrene sulfonic acids.

In the present invention, an electrolyte exhibiting a satisfactory property in both performance and reliability can be obtained by using a so-called "gel electrolyte" prepared by compounding these oxide solid materials or polymers with an electrolyte solution.

If inorganic oxide fine particles are added to the sulfuric acid series electrolyte solution, a solid electrolyte or a gel electrolyte of the present invention, the maintenance of the solution or the maintenance of the electrolyte is further increased so as to increase the specific surface area to about 10 m$^2$/g or more in terms of the BET specific surface area. However, it is desirable for the fine particles to have a larger specific surface area. Preferably, fine particles having a BET specific surface area of at least about 50 m$^2$/g are used.

The size of the inorganic fine particles (i.e., primary particles where the fine particles are agglomerated to form secondary particles) is not particularly limited as far as the inorganic fine particles can be mixed with a polymerizable composition. However, used are inorganic fine particles having a maximum particle diameter of about 10 μm or less. More preferably, fine particles having a maximum diameter falling within a range from about 0.001 μm to about 1 μm are used. Further preferably, inorganic fine particles of various shapes such as spherical particles, egg-shaped particles, cubic particles, parallelepiped particles, cylindrical particles and rod-like particles are used.

Inorganic fine particles that are non-electrically conductive and electrochemically stable are selected in the present invention. More preferably, inorganic fine particles exhibiting an ionic conductivity are used in the present invention.

The inorganic fine particles used in the present invention include, for example, alumina-based fine particles such as α-, β- and γ-alumina particles, silica-based fine particles, titania-based fine particles, magnesia-based fine particles and tonically conductive or non-electrically conductive oxide fine particles such as complex oxide fine particles thereof. Among these, the alumina-based fine particles and silica-based fine particles are preferable because these fine particles are excellent in stability and exhibit a large mutual function with the electrolyte ions. Particularly, the surfaces of the alumina-based fine particles exhibit a high affinity with the electrolyte anions so as to decrease, particularly, the restraint to the proton, thereby promoting the proton migration.

The concrete examples of the alumina-based fine particles include, for example, α-, β- or γ-$Al_2O_3$ fine particles prepared by various methods such as a solid phase method and a gaseous phase method and alumina-based complex oxide fine particles formed between these alumina fine particles and other metals. Among these, γ-$Al_2O_3$ fine particles of aluminum oxide C (trade name; manufactured by Degssa Inc.) and UA-5805 (manufactured by Showa Denko K.K.) are suitable because these γ-$Al_2O_3$ fine particles have a large specific surface area and a high surface activity.

The concrete examples of the silica-based fine particles include, for example, Aerosil (trade name; manufactured by Degssa Inc.) and colloidal silica having a large specific surface area and a high surface activity.

When inorganic fine particles are added in an unduly large amount to the electrolyte solution, a solid electrolyte or a gel electrolyte, some problems are brought about. That is, the viscosity of the electrolyte solution, the solid electrolyte or the gel electrolyte is increased. Also, the ionic conductivity of the electrolyte solution, the solid electrolyte or the gel electrolyte is lowered. Accordingly, it is preferable to add the inorganic fine particles in an amount of 0.1 to 50% by weight, more preferably 1 to 30% by weight, based on the weight of the electrolyte solution, the solid electrolyte or the gel electrolyte.

<Construction of Proton Battery and Manufacturing Method>

FIG. 1 shows the construction of a sheet type proton battery of the present invention. In principle, the battery is of a laminate structure of positive electrode/ion conductive layer/negative electrode. In FIG. 1, 1 indicates positive electrode; 2 ion conductive layer+ separator; 3 negative electrode; 4 positive electrode can; 5 negative electrode can; 6 positive electrode current collector; 7 negative electrode current collector; 8 insulating resin.

For preparing the electrode, the electrode material described previously is mixed with a conductor assistant such as Ketchen black. In some cases, a mixture containing the electrode material, a polymer binder such as PVDF (polyvinylidene fluoride), Teflon and the like and/or the proton conductive electrolyte material described previously is sufficiently kneaded, followed by coating a current collector such as an electrically conductive rubber sheet with the kneaded mixture and subsequently pressing to mold the coated collector into a desired thickness.

When the electrolyte material is a solid electrolyte and/or a gel electrolyte obtained by curing a solution of a mixture containing a polymerizable compound having a double bond and a proton conductive substance, it is advantageous in terms of process in some cases to impregnate an electrode molded in advance by using another binder with the solution of the mixture, followed by curing the polymerizable compound.

In the present invention, the proton conductive electrolyte solution, the solid electrolyte or the gel electrolyte described previously is used in the ion conductive layer. When the electrolyte solution is used in the ion conductive layer, the general purpose separator material, for example, a porous polymer film described herein later, is impregnated with the electrolyte solution. In the case of using the solid electrolyte or the gel electrolyte in the ion conductive layer, such an electrolyte is singly molded into a film. Moreover, for improving the mechanical strength of the film, it is possible to use the film of the solid electrolyte or the gel electrolyte in combination with a porous polymer film as in the case of using an electrolyte solution. It should be noted, however, that the ion conductivity is lowered or rendered unstable depending on the kind of the polymer used, the film shape and the ratio of the materials used, making it necessary to select appropriately the materials. The used porous polymer films include, for example, a polypropylene unwoven fabric, a porous polyolefin film including a mesh-like polyolefin sheet such as a polyethylene net, a polyolefin micro-porous film such as Cellguard (trade name), a nylon unwoven fabric, and a polyester net. In terms of stability, a polyolefin porous film is preferable. Moreover, the porosity may be about 10 to 90%. However, since a high porosity is preferable as far as the mechanical strength permits, the porosity preferably ranges 40% to 90%.

As for the solid electrolyte and/or the gel electrolyte used in the present invention, the one obtained by curing a polymerizable composition containing a mixture of a polymerizable compound having a double bond and a proton conductive substance is simple in the element manufacturing process and advantageous in the manufacturing cost. For example, when an electrode is coated with a polymerizable composition for impregnation thereof into the electrode, followed by polymerizing the polymerizable composition by heating and/or irradiation with active rays for the curing, the bonding strength of the electrolyte to the electrode is increased, an electrolyte film can be formed uniformly, and simple control to the film thickness is achieved. It is also possible to prepare a laminate structure of a positive electrode/separator material/negative electrode, followed by housing the laminate structure within a battery case and subsequently curing the polymerizable composition in the laminate structure by impregnating the same.

In addition, the heating temperature for polymerization, which depends on the kind of the polymerizable compound and on the kind of the initiator, is not particularly limited as far as the polymerization takes place. However, the heating is performed in general within a range from 0° C. to 200° C. When the polymerization is performed by irradiation with active rays, irradiation is performed with ultraviolet rays or an electron beam, γ-ray and the like of at least several mW using active rays initiator such as benzyl methyl ketal or benzophenone, depending on the kind of the polymerizable composition. The polymerizable compound having a double bond used in the present invention includes, for example, a polymerizable compound having any one of the functional groups represented by formula (4) and/or formula (5). The particular compound is preferable because the compound is highly polymerizable and can be easily polymerized even under the state of containing a proton conductive substance and a solvent. The solid electrolyte and/or the gel electrolyte thus obtained exhibits a high mechanical strength.

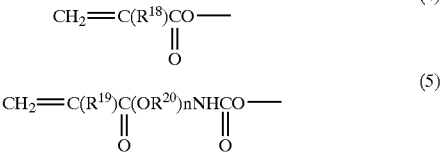

[wherein each of $R^{18}$ and $R^{19}$ represents hydrogen, alkyl group or halogenated alkyl group; and $R^{20}$ represents a divalent group having 10 or less carbon atoms in which the divalent group may include a hetero atom and may have any of linear, branched and cyclic structure; and n is 0 or an integer of 1 to 10; provided that each of $R^{18}$, $R^{19}$, $R^{20}$ and n in a plurality of the polymerizable functional groups represented by formula (4) or (5) included in the same molecule are independent of each other and need not be the same.]

The entire laminate structure of positive electrode/electrolyte/negative electrode thus obtained is housed in a jacket of the battery, the jacket being made of an aluminum laminate body, a polyolefin resin and the like, and is sealed by an insulating resin such as a polyolefin resin or an epoxy resin so as to obtain a proton migration type secondary battery of the present invention.

The construction of the proton battery of the present invention is not limited to the sheet type as shown in FIG. 1. Any optional shape such as a chip shape, a coin shape, a rectangular shape or a cylindrical shape can be employed. Also, the proton battery of various sizes can be manufactured. The thickness of the battery, which depends on the shape of the battery, is 1 mm or less, e.g., about 0.5 mm.

BEST MODE FOR CARRYING OUT THE INVENTION

The present invention will now be described in detail with reference to typical Examples as follows. Incidentally, the following Examples are simply for the specific description of the present invention and do not limit at all the technical scope of the present invention.

EXAMPLE 1

Synthesis of Polyphenyl Quinoxaline (PPQ)

PPQ was synthesized as follows in accordance with the description in a publication "Journal of Polymer Science: part A-1, vol. 5, page 1453, 1967".

Specifically, 50 g of 4-phenyl oxalylbenzil (Mw 342.4) and 31.5 g of 3,3'-diaminobenzidine (Mw 214.3) were dissolved in 350 ml of DMF, and the resultant solution was subjected to reflux for 35 hours under a nitrogen gas atmosphere so as to obtain a yellow precipitate. The yellow precipitate was filtered, dried and, then, stirred for 8 hours within 500 ml of a concentrated hydrochloric acid, followed by filtration and washing with water for the refining purpose. Further, the refined precipitate was subjected to a vacuum drying for 8 hours at 80° C. so as to obtain 71 g of PPQ, which was a yellow powder. The PPQ thus obtained was estimated to have substantially the aimed structure from the elemental analysis and IR. PPQ was found to have a number average molecular weight of about 12,000 and a weight average molecular weight of about 50,000 from the result of GPC analysis within HFIP (hexafluoro isopropanol).

EXAMPLE 2

Manufacture of PPQ Negative Electrode

The PPQ powder synthesized in Example 1 and Ketchen black (KB: carbon black manufactured by Ketchen Black International Inc.) were subjected to a dry mixing at a eight ratio of 75:25. The mixture was subjected to a pressure molding on a SUS foil of 15 μm thickness, 15 mmØ, at 250° C. under a pressure of 1 ton for 15 minutes so as to obtain a PPQ/KB composite electrode (31.8 mg) having a thickness of about 200 μm.

EXAMPLE 3

Synthesis of Polyaniline (PAn)

Aniline was subjected to an oxidation polymerization within 1 N hydrochloric acid using ammonium persulfate as an oxidizing agent, followed by neutralization with an aqueous solution of ammonia in accordance with the method described in JP-A-62-108459 so as to obtain 100 g of a deep purple polyaniline (PAn) base powder. The PAn thus obtained was estimated to have substantially the aimed structure from the elemental analysis and IR. Also, the PAn was found to have a number average molecular weight of about 50,000 and a weight average molecular weight of about 120,000 from the result of GPC analysis within NMP (N-methyl pyrrolidone).

EXAMPLE 4

Manufacture of PAn Positive Electrode

A gel-like composition was obtained by adding an excess NMP (N-methyl pyrrolidone) to a mixture consisting of the PAn powder thus obtained, an acetylene black (AB: manufactured by Denki Kagaku K.K.) and polyvinylidene fluoride (PVDF: manufactured by Kurare K.K.) mixed at a ratio of 85:7:8. The resultant composition was coated on a SUS foil of about 15 μm thickness, 15 mmØ, followed by applying a pressure molding under a pressure of 1 ton and subsequently subjecting the resultant structure to a vacuum drying for 8 hours at 80° C. so as to obtain a PAn electrode (30.9 mg) having a thickness of about 250 μm.

EXAMPLE 5

Manufacture of Proton Secondary Battery

The PPQ negative electrode (15 mmØ) manufactured in Example 2 was arranged within a negative electrode can of a coin cell (2016 type, made of SUS304) such that the SUS foil was positioned on the side of the can, followed by superposing a micro-porous film separator made of PP subjected to a hydrophilic treatment (Juraguard 3501 manufactured by Polyplastic K.K., 25 μm thickness, 17 mmØ) thereon. Then, an electrolyte solution consisting of a 20 wt % aqueous solution of sulfuric acid was poured into the can to allow the negative electrode and the separator to be immersed therein. This condition was left to stand for one hour. Further, the PAn positive electrode (15 mmØ) manufactured in Example 4, which was dipped in and left to stand in a 20 wt % aqueous solution of sulfuric acid in another container, was superposed on the separator, followed by sealing the can with a coin cell caulking device available on the market so as to manufacture a PPQ/PAn series coin cell (2016 type).

A charge-discharge test was applied to the battery thus manufactured at 25° C., under an operating voltage of 0 to 0.8 V and under a current of 1.75 mA. A maximum discharge capacity was found to be 2.5 mAh. Also, the discharge capacities in the cases where the current values were increased to 7.0 mA and 17.5 mA were found to be 2.5 mA and 2.4 mA, which were substantially the same, supporting that the battery was excellent in the rapid discharge properties. Moreover, the battery was discharged at 1.75 mA at 0° C. and −10° C. In this case, the capacity was found to be 2.2 mAh and 1.8 mAh, supporting that the decrease in the battery capacity was small under low temperatures.

EXAMPLE 6

Synthesis of Polymerizable Compound (Compound 3)

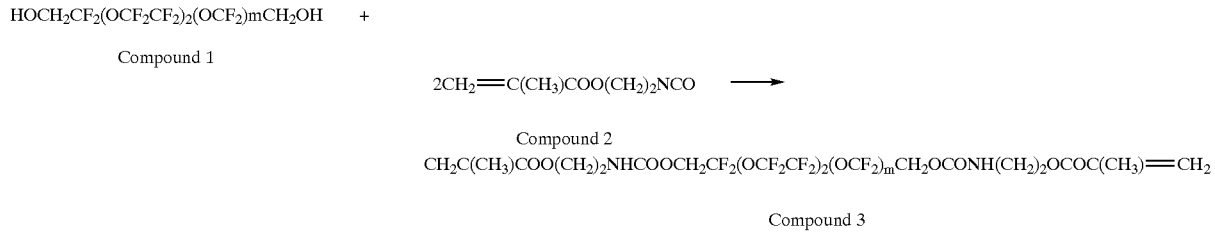

A reaction was carried out in accordance with the reaction formula given above by mixing 100 g of compound 1 (Zdol manufactured by Nippon Aojimunt K.K.: average molecular weight of about 2,000) and 15.5 g of compound 2 with 100 mL of well refined THF under a nitrogen gas atmosphere, followed by adding 0.66 g of dibutyltin dilaurate as a catalyst. Then, reaction was carried out at 25° C. for about 15 hours so as to obtain a polymerizable compound 3, which was a colorless viscous liquid. It has been found as a result of $^1$H-NMR, IR and elemental analysis that compound 1 and compound 2 were reacted at a ratio of 1:2, and that the isocyanate group of compound 2 disappeared and an urethane bond was formed so as to form compound 3.

EXAMPLE 7

Preparation of Alumina-containing Solid Electrolyte Film (A)

0.33 g of a high purity γ-alumina manufactured by Showa Denko K.K. by applying a heat treatment at 1000° C. for 2 hours under a dry air atmosphere (trade name: UA5805, crystal grain diameter: 0.03 μm, average secondary particle diameter: 1.8 μm, BET specific surface area: 80 m$^2$/g), 1.0 g of compound 3 and 6.0 g of an aqueous solution of 20 wt % sulfuric acid were mixed well to obtain an emulsion-like polymerizable composition. Then, 0.008 g of 2,4,6-trimethylbenzoyl diphenyl phosphine oxide (trade name Lucirin® TPO manufactured by BASF Inc.) was added as a photopolymerization initiator to the resultant polymerizable composition, followed by coating a PET film with the resultant mixture under a nitrogen gas atmosphere. Further, the coating was kept irradiated for 20 minutes with rays emitted from a chemical fluorescent lamp (FL20S. BL manufactured by Sankyo Denki K.K.) so as to obtain a composite film of polymer of compound 3 impregnated with an aqueous solution of sulfuric acid and UA5805 as a self-standing film having a thickness of about 50 μm. The ion conductivity of the composite film was measured at 25° C. and −10° C. by an impedance method so as to obtain an ion conductivity of $186 \times 10^{-3}$ and $60 \times 10^{-3}$ S/cm, respectively.

EXAMPLE 8

Preparation of Alumina-containing Solid Electrolyte Film (B)

A polymerizable composition was obtained as in Example 7, except that 0.33 g of aluminum oxide C subjected to a heat treatment at 1000° C. (trade name: manufactured by Nippon Aerozil K.K., crystal grain diameter: 0.013 μm, average secondary grain diameter: 0.11 μM (SEM observation), BET specific surface area: 100 m$^2$/g) was used as alumina-based fine particles in place of UA5805.

Lucirin® TPO was added to the polymerizable composition as in Example 7, followed by irradiating the composition with rays emitted from a chemical fluorescent lamp so as to obtain a composite film of polymer of compound 3 impregnated with an aqueous solution of sulfuric acid and aluminum oxide C as a self-standing film having a thickness of about 50 μm. The ion conductivity of the composite film was measured at 25° C. and −10° C. by an impedance method so as to obtain an ion conductivity of $202 \times 10^{-3}$ and $66 \times 10^3$ S/cm, respectively.

EXAMPLE 9

Preparation of Silica-containing Solid Electrolyte Film (E)

A polymerizable composition was obtained as in Example 7, except that 0.33 g of silica fine particles manufactured by Nippon Aerozil K.K. and subjected to a heat treatment at 1000° C. (Aerozil® 2000, crystal grain diameter: 0.012 μm, average secondary grain diameter: about 0.1 μm (SEM observation), BET specific surface area: 180 m$^2$/g) was used as inorganic oxide fine particles in place of UA5805.

Lucirin® TPO was added to the polymerizable composition as in Example 7, followed by irradiating the composition with rays emitted from a chemical fluorescent lamp so as to obtain a composite film of polymer of compound 3 impregnated with an aqueous solution of sulfuric acid and silica fine particles as a self-standing film having a thickness of about 50 μm. The ion conductivity of the composite film was measured at 25° C. and −10° C. by an impedance method so as to obtain an ion conductivity of $186 \times 10^{-3}$ and $56 \times 10^{-3}$ S/cm, respectively.

EXAMPLE 10

Manufacture of Proton Secondary Battery

The PPQ negative electrode (15 mmØ) manufactured in Example 2 was arranged within a negative electrode can of a coin cell (2016 type, made of SUS304) such that the SUS foil was positioned on the side of the can, followed by superposing the polymer of compound 3/aluminum oxide C composite film manufactured in Example 8, which was punched in a size of 17 mmØ (50 μm thickness), on the PPQ negative electrode. Then, an electrolyte solution consisting of a 20 wt % aqueous solution of sulfuric acid was poured into the can to allow the negative electrode and the composite film to be immersed in the electrolyte solution. This condition was left to stand for one hour. Further, the PAn positive electrode (15 mmØ) manufactured in Example 4, which was dipped in and left to stand in an aqueous solution consisting of 20 wt % aqueous solution of sulfuric acid and housed in another container, was superposed on the separator, followed by sealing the can with a coin cell caulking device available on the market so as to manufacture a PPQ/composite film/PAn series coin cell (2016 type).

A charge-discharge test was applied to the battery thus manufactured at 25° C., under an operating voltage of 0 to 0.8 V and under a current of 1.75 mA. A maximum discharge capacity was found to be 2.5 mAh. Also, the discharge capacities in the cases where the current values were increased to 7.0 mA and 17.5 mA were found to be 2.4 mA and 2.2 mA, which were substantially the same, supporting that the battery was excellent in the rapid discharge properties. Further, the battery was discharged at 1.75 mA at 0° C. and −10° C. In this case, the capacity was found to be 2.0 mAh and 1.5 mAh, supporting that the decrease in the battery capacity was small under low temperatures.

EXAMPLE 11

Preparation of Alumina-containing Electrolyte 1.0 g of aluminum oxide C subjected to a heat treatment at 1000° C. was added to 50 g of 20% aqueous solution of sulfuric acid, followed by sufficiently stirring the mixture at a room temperature so as to obtain an electrolyte solution containing aluminum oxide C. The ion conductivity of the electrolyte was measured at 25° C. and −10° C. by an impedance method so as to obtain an ion conductivity of $500 \times 10^{-3}$ S/cm and $150 \times 10^{-3}$ S/cm, respectively.

EXAMPLE 12

Manufacture of Proton Secondary Battery

A PPQ/PAn series coin cell (2016 type) was manufactured as in Example 5, except that the electrolyte containing aluminum oxide C prepared in Example 11 was used as the electrolyte.

A charge-discharge test was applied to the battery thus manufactured at 25° C., under an operating voltage of 0 to 0.8 V and under a current of 1.75 mA. A maximum discharge capacity was found to be 2.5 mAh. Also, the discharge capacities in the cases where the current values were increased to 7.0 mA and 17.5 mA were found to be 2.4 mA and 2.3 mA, which were substantially the same, supporting that the battery was excellent in the rapid discharge properties. Further, the battery was discharged at 1.75 mA at 0° C. and −10° C. In this case, the capacity was found to be 2.3 mAh and 2.0 mAh, supporting that the decrease in the battery capacity was small under low temperatures.

INDUSTRIAL APPLICABILITY

In the proton secondary battery of the present invention, the charge-discharge reaction is performed on the basis of only the migration of proton having the smallest atomic weight and, thus, the proton secondary battery of the present invention is excellent in its rapid charge-discharge properties and in its low temperature properties.

Also, a polymer having a quinoxaline structure having a large proton insertion-release capacity is used as a negative electrode material, making it possible to obtain a battery having a large charge-discharge capacity.

Further, it is possible to use a solid electrolyte and/or a gel electrolyte in the present invention, making it possible to obtain a battery having a high stability and excellent in reliability and safety.

What is claimed is:

1. A material capable of charge-discharge reaction by insertion-release of protons, comprising a polymer having a poly-2,2'-(p-diphenylene)-3,3'-diphenyl-6,6'-oxydiquinoxaline (POPQ) structure represented by formula (7)

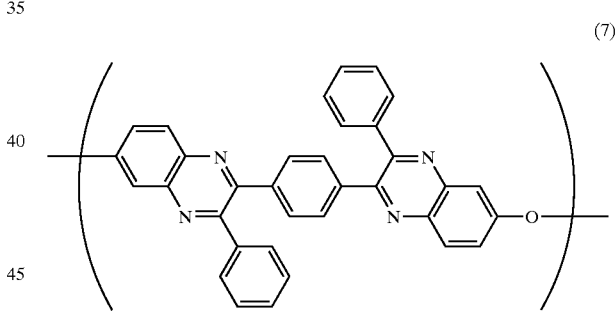

(7)

as a repeating structural unit.

* * * * *